United States Patent
Pellerin et al.

(10) Patent No.: US 12,286,383 B2
(45) Date of Patent: Apr. 29, 2025

(54) METHOD FOR USING ALKANOLAMINE IN A GRINDER

(71) Applicant: CHRYSO, Issy les Moulineaux (FR)

(72) Inventors: Bruno Pellerin, Avon (FR); Martinho Duarte Amaro Correia, Johannesburg (ZA)

(73) Assignee: CHRYSO, Issy-les-Moulineaux (FR)

( * ) Notice: Subject to any disclaimer, the term of this patent is extended or adjusted under 35 U.S.C. 154(b) by 848 days.

(21) Appl. No.: 17/284,261

(22) PCT Filed: Oct. 10, 2019

(86) PCT No.: PCT/EP2019/077456
§ 371 (c)(1),
(2) Date: Apr. 9, 2021

(87) PCT Pub. No.: WO2020/074633
PCT Pub. Date: Apr. 16, 2020

(65) Prior Publication Data
US 2021/0387909 A1     Dec. 16, 2021

(30) Foreign Application Priority Data
Oct. 10, 2018   (FR) ..................... 18 59381

(51) Int. Cl.
| C04B 7/52 | (2006.01) |
| C04B 24/12 | (2006.01) |
| C04B 28/02 | (2006.01) |
| C04B 103/50 | (2006.01) |

(52) U.S. Cl.
CPC .............. *C04B 7/52* (2013.01); *C04B 24/122* (2013.01); *C04B 28/02* (2013.01); *C04B 2103/50* (2013.01)

(58) Field of Classification Search
None
See application file for complete search history.

(56) References Cited

U.S. PATENT DOCUMENTS

| 6,290,772 B1 | 9/2001 | Cheung et al. |
| 2013/0112113 A1 | 5/2013 | Sagawa et al. |
| 2014/0076203 A1 | 3/2014 | Marazzani et al. |
| 2015/0027347 A1* | 1/2015 | Pellerin .................. C04B 24/12 106/715 |
| 2023/0009974 A1 | 1/2023 | Patra |

FOREIGN PATENT DOCUMENTS

| CN | 102040347 | | 5/2011 |
| CN | 102060462 A | | 5/2011 |
| CN | 103664652 A | | 3/2014 |
| CN | 104692696 A | | 6/2015 |
| CN | 105621924 A | | 6/2016 |
| EP | 0 663 892 | | 6/1997 |
| FR | 3 002 162 | | 8/2014 |
| GB | 2099414 A | | 12/1982 |
| JP | 2003-527275 A | | 9/2003 |
| JP | 2008-290932 A | | 12/2008 |
| JP | 2012-036077 A | | 2/2012 |
| JP | 2012-167002 A | | 9/2012 |
| JP | 2016-516652 A | | 6/2016 |
| JP | 2016-124719 A | | 7/2016 |
| WO | 2009/060405 | | 5/2009 |
| WO | 2011/161447 A1 | | 12/2011 |

OTHER PUBLICATIONS

International Search Report for PCT/EP2019/077456 dated Jan. 3, 2020, 5 pages.
Written Opinion of the ISA for PCT/EP2019/077456 dated Jan. 3, 2020, 6 pages.
French Search Report for FR 1859381 dated Aug. 6, 2019, 2 pages.

* cited by examiner

*Primary Examiner* — Michael Forrest
(74) *Attorney, Agent, or Firm* — NIXON & VANDERHYE

(57) ABSTRACT

Disclosed is a method for using a secondary or tertiary alkanolamine for grinding cement, the method including: forming an inorganic acid salt of the alkanolamine; and adding the salified alkanolamine to a grinder.

6 Claims, 2 Drawing Sheets

METHOD FOR USING ALKANOLAMINE IN A GRINDER

CROSS-REFERENCE TO RELATED APPLICATIONS

This application is the U.S. national phase of International Application No. PCT/EP2019/077456 filed Oct. 10, 2019 which designated the U.S. and claims priority to FR 18 59381 filed Oct. 10, 2018, the entire contents of each of which are hereby incorporated by reference.

BACKGROUND OF THE INVENTION

Field of the Invention

The present invention relates to the stabilisation of alkanolamines used in grinding methods, in particular in grinding methods for grinding hydraulic binder, in particular clinker.

Description of the Related Art

It is a known practice to use alkanolamines when grinding clinker. Alkanolamines are also known to improve the mechanical strengths of cement-based hydraulic compositions.

It has therefore been proposed to combine these effects and to use the alkanolamines at the time of grinding the hydraulic binder, in particular cement, in order to benefit from the grinding properties of alkanolamines while also introducing into the hydraulic binder active ingredients that that serve the purpose of improving the mechanical strengths during the preparation of hydraulic binder compositions.

However, certain alkanolamines, in particular triisopropanolamine (TIPA), used during grinding, will get degraded by temperature and will therefore no longer be available to participate in the obtaining of good mechanical strengths during the preparation of the hydraulic binder compositions. To overcome this problem, it has been envisaged to add a greater quantity of alkanolamine in order to compensate for the degradation thereof. However, the increase in the concentration of alkanolamine in certain grinding mills (or grinders) results in an excessively high grinding efficiency and the super-fluidification of the cement powder leads to draining or emptying of the grinding mill, which is not desirable.

From FR 3 002 162 it is also a known practice to use AMP (2-amino-2-methyl-propanol), in particular in the form of an organic salt, during the grinding of the clinker. However, this results in an increase in the fluidity of the cement and therefore in insufficient grinding of the clinker.

There is therefore an interest in providing a method that makes it possible to use alkanolamines during the grinding of a hydraulic binder, in particular cement, while also not degrading the grinding conditions, in particular by not emptying (or not draining) the mill.

There is also an interest in providing such a method that makes it possible to reduce the fluidity of the hydraulic binder and consequently to increase its time of passage through the grinding mill, in order to obtain a finer powder while also making it possible to obtain good mechanical strengths.

There is also an interest in providing a method that makes it possible, during the grinding step of grinding the hydraulic binder, to provide the compounds necessary for improving the properties related to mechanical strengths and in particular mechanical strengths at 28 days, of the hydraulic binder compositions, while also not degrading the grinding conditions, in particular by not emptying the grinding mill.

SUMMARY OF THE INVENTION

One objective of the present invention is therefore to provide a method that makes it possible to stabilise the alkanolamines used in a grinding mill.

Another objective of the invention is to provide such a method that makes it possible at the same time to maintain an impact on improving the mechanical strengths, in particular at 28 days, of hydraulic binder compositions.

Yet another objective of the present invention is to provide a means that serves to enable controlling the performance elements of the grinding agent for grinding alkanolamines while also retaining the properties relevant to improving the mechanical strengths, in particular at 28 days during the preparation of the hydraulic binder compositions.

The object of the present invention is particularly advantageous in all situations where the requirements in terms of grinding performance are low (nature of the clinker, co-grinding of the clinker with soft materials (for example limestone filler, natural pozzolans), low performance grinding mills, open circuit grinders without separation (classification) system, closed circuit grinding systems, for example with constant air flow separators, method with cement transfer by inclined conveyor belt, open bucket elevators, dust filtres that are inefficient or close to saturation (high differential pressure, worn-out bag filtres)).

The object of the present invention is particularly advantageous during the co-grinding of clinker and limestone for the manufacture of CEM II/A or CEM II/B LL, which, in order to improve the mechanical strengths at 28 days, necessitate high levels of amine dosage (for example 120 g of triisopropanolamine (TIPA) per tonne of cement). When such dosage levels are used on certain plants, a rapid draining or emptying of the grinding mill is observed, as well as critical phenomena of dusting forming at the outlet of the grinding mill and at the level of the elevator.

In a surprising manner, it has been observed that the use of amines in the form of salts makes it possible to control the grinding performance elements of amines, while also retaining all of the performance elements related to improving the mechanical strengths at 28 days.

The present invention which meets all of these objectives, relates to a method for using alkanolamine, preferably secondary or tertiary alkanolamine, for grinding at least one hydraulic binder, preferably cement, the method comprising:
  forming of a salt, preferably an inorganic acid salt, of the alkanolamine;
  adding of the salified alkanolamine into a grinding mill.
The method preferably further comprises the grinding of the said hydraulic binder.

Preferably, the present invention relates to a method for using secondary or tertiary alkanolamine, for grinding at least one hydraulic binder, the method comprising:
  forming of an inorganic acid salt of the alkanolamine;
  adding of the salified alkanolamine into a grinding mill.
The method preferably further comprises grinding of the said hydraulic binder.

Preferably, the alkanolamine is an alkanolamine having the formula (I) $N(R^1OH)(R^2)(R^3)$ (I) in which the $R^1$, which may be identical or different, represent a linear or branched alkyl group comprising from 1 to 10 carbon atoms, preferably from 1 to 5 carbon atoms, $R^2$ represents H or an $R^1$—OH group, $R^3$ represents H, a linear or branched alkyl group comprising from 1 to 10 carbon atoms, preferably from 1 to 5 carbon atoms, an $R^4$—OH group in which $R^4$ represents a linear or branched alkyl group comprising from 1 to 10 carbon atoms, preferably from 1 to 5 carbon atoms, or an (alkyl)-N(alkyl-OH)$_2$ group, the alkyl being linear or branched and comprising from 1 to 5 carbon atoms, preferably (CH$_2$—CH$_2$)—N(CH$_2$—CH$_2$—OH)$_2$, at least one of $R^2$ and $R^3$ being different from H.

Preferably, the alkanolamine is an alkanolamine having the formula (I) N(R$^1$OH)(R$^1$OH) (R$^3$) (I) in which the R$^1$ groups, which may be identical or different, represent a linear or branched alkyl group comprising from 1 to 10 carbon atoms, preferably from 1 to 5 carbon atoms, R$^3$ represents H, a linear or branched alkyl group comprising from 1 to 10 carbon atoms, preferably from 1 to 5 carbon atoms, an R$^4$—OH group in which R$^4$ represents a linear or branched alkyl group comprising from 1 to 10 carbon atoms, preferably from 1 to 5 carbon atoms.

The method of the present invention does not cover the use of salts of acetic acid. The method of the present invention does not cover the use of AMP (2-amino-2-methyl-propanol).

The present invention also relates to a method for improving the mechanical strengths of a hydraulic binder composition, which comprises the use of an alkanolamine salt, preferably an inorganic alkanolamine salt, preferably of an alkanolamine having the formula (I), during the grinding of the hydraulic binder. In a particularly advantageous manner, the method makes it possible to improve the mechanical strengths of the hydraulic binder composition without affecting the performance elements of the grinding of hydraulic binder, in particular clinker.

Preferably, in the context of the invention, when reference is made to the mechanical strengths, it is preferably the mechanical strengths at 28 days.

The inorganic alkanolamine salts having the formula (I) are selected from among acid halide salts, salts of sulfuric acid, phosphoric acid, phosphonic acid, or hydrogen sulphate.

In a preferred manner, the alkanolamine salt is a salt of sulfuric acid, phosphoric acid or phosphonic acid, preferably of sulfuric acid.

In a preferred manner, the alkanolamine salt is an acid halide salt. In particular, a hydrochloric acid salt.

The method of the present invention can be applied to any type of alkanolamine, preferably secondary or tertiary alkanolamine, preferably having the formula (I), in particular to any type of secondary or tertiary alkanolamine having the formula (I) used in grinding mills, especially in grinding mills for grinding clinker and hydraulic binders. More particularly, mention may be made of triisopropanolamine (TIPA), diisopropanolamine (DIPA), diethanolisopropanolamine (DEIPA), ethanoldiisopropanolamine (EDIPA), N,N,N',N'-tetrakis(2-hydroxyethyl)ethylenediamine (THEED), and methyldiethanolamine (MDEA). Preferably, the alkanolamine is selected from among triisopropanolamine (TIPA), diethanolisopropanolamine (DEIPA), and ethanoldiisopropanolamine (EDIPA). Preferably, the alkanolamine is triisopropanolamine (TIPA).

The preparation of the alkanolamine salt is preferably carried out by stoichiometric mixing between the alkanolamine and the acid. Since the reaction may be exothermic, it may be necessary to cool the medium during the reaction. For this reason, the synthesis of the alkanolamine salt is preferably carried out in a glass vessel immersed in a cold water bath and the temperature as well as the pH are continuously measured.

The present invention also relates to a method for reducing the fluidity of the hydraulic binder in a grinding mill, which comprises the use of an inorganic salt of secondary or tertiary alkanolamine, preferably having the formula (I), during the grinding of the hydraulic binder.

In the context of the present invention, any type of grinding mill may be used. In particular, the invention relates to implementation in vertical mills, ball mills, roller mills, open circuit grinders without separation (classification) system, closed circuit grinding systems whether or not with constant air flow separators, method with cement transfer by inclined conveyor belt, open bucket elevators, dust filtres that are inefficient or close to saturation (high differential pressure, worn-out bag filtres). Preferably, the grinding mill is a ball mill, or a vertical mill.

The object of the present invention is particularly advantageous during co-grinding of clinker and mineral additives for the manufacture of CEM II/A or CEM II/B or CEM III, which, in order to improve the mechanical strengths at 28 days, necessitate high levels of amine dosage (for example 120 g of triisopropanolamine (TIPA) per tonne of cement). When such dosage levels are used on certain plants, a rapid draining or emptying of the grinding mill is observed, as well as critical phenomena of dusting forming at the outlet of the grinding mill and at the level of the elevator.

The present invention pertains to the grinding of any type of hydraulic binder and in particular of clinker and/or mineral additives.

In the context of the present invention, the term "hydraulic binder" is understood to refer to any compound that has the property of becoming hydrated in the presence of water and the hydration of which makes it possible to obtain a solid having mechanical characteristics, in particular a cement such as a Portland cement, aluminous cement, pozzolanic cement, or else an anhydrous or semi-hydrated calcium sulphate. The hydraulic binder may be a cement according to the standard EN197-1 (2001) and in particular a Portland cement, mineral additives, in particular slag, or a cement comprising mineral additives.

The term "cement" is understood to refer to a cement according to the European standard EN 197-1 (2001) and in particular a cement of the following types: CEM I, CEM II, CEM III, CEM IV, or CEM V according to the French/European standard NF EN 197-1 (2012) Cement. The cement may include mineral additives.

The term "mineral additives" is understood to refer to slags (as defined in the standard NF EN 197-1 (2012) Cement paragraph 5.2.2), steelworks slags, pozzolanic materials (as defined in the standard NF EN 197-1 (2012) Cement paragraph 5.2.3), fly ash (as defined in the standard NF EN 197-1 (2012) Cement paragraph 5.2.4), calcined shale (as defined in the standard NF EN 197-1 (2012) Cement paragraph 5.2.5), limestones (as defined in the standard NF EN 197-1 (2012) Cement paragraph 5.2.6) or silica fumes (as defined in the standard NF EN 197-1 (2012) Cement paragraph 5.2.7) or mixtures thereof. Other additives, not currently recognised by the standard NF EN 197-1 (2012) Cement, may also be used. These include metakaolins, such as metakaolins of type A in accordance with the French standard NF P 18-513 (August 2012); siliceous additives, such as siliceous additives with Quartz mineralogy in accordance with the standard NF P 18-509 (September 2012); aluminosilicates, in particular of inorganic geopolymer type.

In a particularly advantageous manner, the inventors have shown that the forming of the alkanolamine salt according to the invention made it possible to reduce its vapour pressure and consequently to protect it from degradation, in particular due to temperature, in the grinding mill. The inventors have shown that against all expectations, despite this forming of salt thereof, the alkanolamine retained its properties for improving the mechanical properties of a hydraulic binder composition, in particular its properties for improving the mechanical strengths, in particular the mechanical strengths at 28 days. Furthermore, and surprisingly, the inventors have shown that the forming of inorganic acid salts, unlike the examples with organic acid salts known from the literature, enabled better grinding and resulted in a decrease in fluidity of the hydraulic binder.

Thus, the present invention makes it possible in a particularly advantageous manner to add the alkanolamine at the time of grinding without it degrading, while also improving grinding and ensuring its properties for improving the mechanical properties of hydraulic binder compositions are retained.

Preferably, the alkanolamine salt is used during grinding in a content of 0.003 to 0.025% by weight of the hydraulic binder, preferably 0.005 to 0.015%.

In a particularly advantageous manner, the alkanolamine salt made use of during the grinding may be used in combination with other additives generally used in hydraulic compositions or during the grinding of the hydraulic binder; mention may in particular be made of alkanolamines other than those having the formula (I); salts such as sodium chloride, calcium chloride, sodium thiocyanate, calcium thiocyanate, sodium nitrate and calcium nitrate and mixtures thereof; glycols, glycerols, water reducing adjuvants/admixtures and high water reducing adjuvants/admixtures, surfactants, carboxylic acids such as acetic, adipic, gluconic, formic, oxalic, citric, maleic, lactic, tartaric, malonic acids and mixtures thereof.

The alkanolamine salt may also be used in combination with setting retarders.

In the context of the present invention, among the setting retarders, mention may in particular be made of setting retarders that are sugar-, molasses-, or vinasse-based.

Preferably, the water reducing and high water reducing adjuvants/admixtures are selected from among:
Sulfonated salts of naphthalene-formaldehyde polycondensates, commonly known as polynaphthalene sulfonates or even naphthalene-based superplasticisers;
Sulfonated salts of melamine-formaldehyde polycondensates, commonly known as melamine-based superplasticisers;
Lignosulfonates;
Sodium gluconate and sodium glucoheptonate;
Polyacrylates;
Polyaryl ethers (PAE);
Products based on polycarboxylic acids, in particular polycarboxylate comb copolymers, which are branched polymers whose main chain bears carboxylic groups and whose side chains are composed of polyether type blocks, in particular polyethylene oxide, such as, for example, poly[(meth)acrylic acid-graft-polyethylene oxide]. The superplasticisers of the ranges CHRYSO® Fluid Optima, CHRYSO® Fluid Premia and CHRYSO® Plast Omega marketed by CHRYSO in particular may be used;
The products based on polyalkoxylated polyphosphonates in particular described in the patent EP 0 663 892 (for example CHRYSO® Fluid Optima 100).

In a particularly advantageous manner, the alkanolamine salt used during grinding may be used in combination with one or more anti-foaming agents, in particular selected from among ethoxylated fatty amines. The inventors have in particular shown that the forming of the salt of alkanolamine makes it possible to obtain a pH zone that enables the solubilisation of ethoxylated fatty amines while retaining the efficacy thereof in applications, in particular concrete, which are in pH zones where they become active.

The present invention also relates to a composition comprising:
At least one hydraulic binder;
An alkanolamine salt as described above.

The composition may additionally also comprise at least one additive as described above.

The present invention also relates to a hydraulic composition comprising:
Water;
At least one hydraulic binder;
An alkanolamine salt;
An aggregate.

The hydraulic composition may further comprise at least one additive as described above.

The term "aggregates" is understood to refer to a mass or body of mineral grains with an average diameter of between 0 and 125 mm. Depending on their diameter, the aggregates are classified into one of the following six families: fillers, sands, fine sand, gravel, grit, and ballast (standard XP P 18-545). The most used aggregates are the following:
Fillers, which have a diameter of less than 2 mm and for which at least 85% of the aggregates have a diameter of less than 1.25 mm and at least 70% of the aggregates have a diameter of less than 0.063 mm;
Sands having a diameter of between 0 and 4 mm (in the standard 13-242, the diameter may go up to 6 mm);
Gravel having a diameter greater than 6.3 mm;
Grit having a diameter of between 2 and 63 mm;
Sands are therefore included in the definition of aggregate according to the invention;
The fillers may in particular be derived from limestone or dolomite.

The hydraulic composition may also comprise other additives known to the person skilled in the art, for example a mineral additive and/or additives such as for example, an anti air-entrainment additive, an anti-foaming agent, a setting accelerator or retarder, a rheology modifying agent, another fluidiser (plasticiser or superplasticiser), in particular a superplasticiser, for example a superplasticiser like CHRYSO® Fluid Premia 180 or CHRYSO® Fluid Premia 196.

BRIEF DESCRIPTION OF THE DRAWINGS

The present invention will now be described with the aid of non-limiting examples.

DESCRIPTION OF THE PREFERRED EMBODIMENTS

Figure 1:
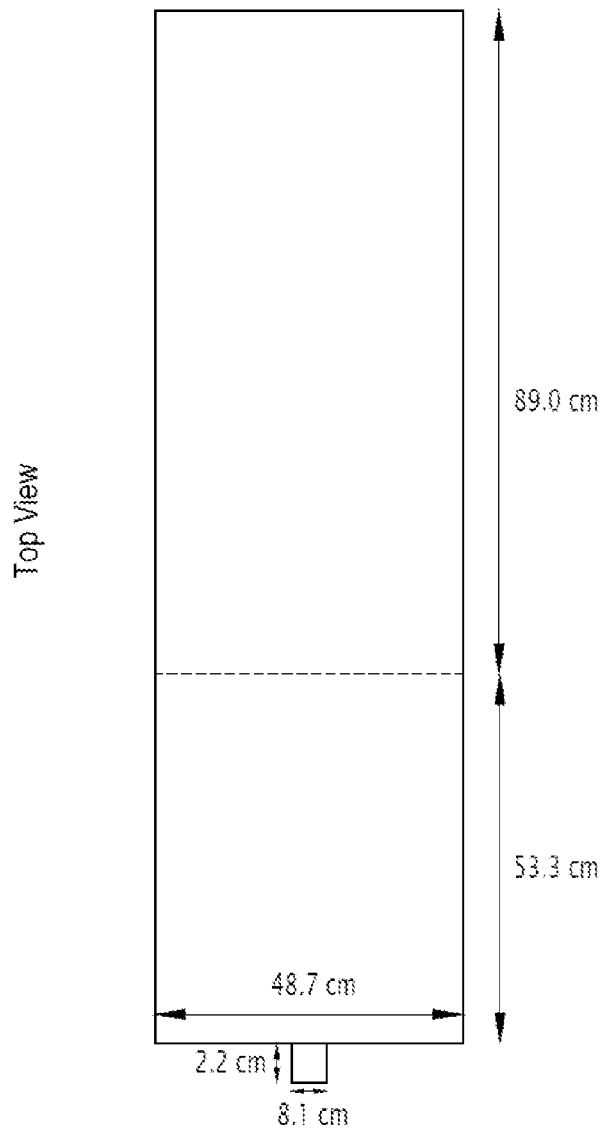
FIG. 1 is a top view of the inclined plane for the rolling bottle test of Example 2.
Figure 2:
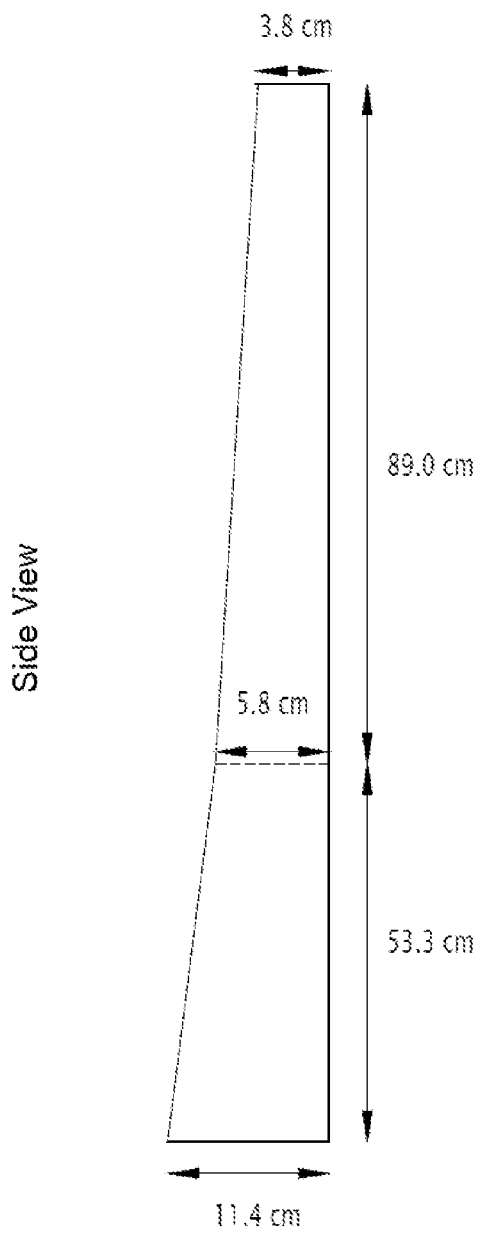
FIG. 2 is a side view of the inclined plane for the rolling bottle test of Example 2.

In these examples, a triisopropanolamine hydrochloric acid salt (TIPA) is used. This salt is obtained according to the following method: a mass of 113 g of triisopropanolamine (TIPA) at a mass concentration of 63% in water was maintained under agitation with a magnetic agitator (or stirrer) and 35 g of hydrochloric acid at 37% mass concentration were added over 30 minutes to obtain about 150 g of solution. The stoichiometric ratio between TIPA and HCl is 1:1. During formulation, the temperature did not exceed 40° C. The solution obtained is clear. The measurements of conductivity and pH as a function of the volume of titrated HCl show a strong variation in values at the time of the end of the reaction between TIPA and HCl, which confirms the chemical reaction between the two reagents. Indeed, it is possible to prove the formation of protonated TIPA by reverse acid-base assay. If sodium hydroxide (0.1 mol/L) is added to the solution of TIPA+HCl, a jump in pH is noted at an equivalence volume of sodium hydroxide that is characteristic of the acidity constant of this chemical compound. (TIPA/TIPA+HCl). At half the equivalent volume, the pH is equal to the pKa of this chemical compound (TIPA/TIPA+HCl) which is close to 8. Conversely, TIPA does not show a jump in pH since the amine is already in basic form.

Based on the same type of chemical reaction, it is possible to prepare a hydrochloric acid salt of diethanolisopropanolamine (DEIPA). This salt is obtained according to the following method: a mass of 80 g of diethanolisopropanolamine (DEIPA) at a mass concentration of 87% in water was maintained under agitation with a magnetic agitator and 42 g of hydrochloric acid at 37% mass concentration were added over 30 minutes to obtain about 150 g of solution. The stoichiometric ratio between DEIPA and HCl is 1:1. During formulation, the temperature did not exceed 40° C. The solution obtained is clear. The formation of the protonated amine DEIPA+HCl can be confirmed by reverse acid-base titration. The DEIPA+HCL. compound does indeed exhibit a pH jump that is characteristic of the acid-base compound DEIPA/DEIPA+HCl during the adding of sodium hydroxide, which indicates a pKa close to 8. Indeed, TIPA and DEIPA are amines with very similar acidity constants, with a pKa around 8. Conversely, non-protonated DEIPA does not show a jump in pH during the adding of sodium hydroxide.

Based on the same type of chemical reaction, it is possible to prepare a sulfuric acid salt of triisopropanolamine (TIPA). This salt is obtained according to the following method: a mass of 129 g of triisopropanolamine (TIPA) at a mass concentration of 61% in water was maintained under agitation with a magnetic agitator and 21 g of sulfuric acid at 95% mass concentration were added over 30 minutes to obtain about 150 g of solution. The stoichiometric ratio between TIPA and $H_2SO_4$ is 2:1. During formulation, the temperature did not exceed 40° C. The solution obtained is clear. The formation of the protonated TIPA+$H_2SO_4$ amine can be confirmed by reverse acid-base titration. The TIPA+$H_2SO_4$ compound does indeed exhibit a jump in pH that is characteristic of TIPA, of close to 8.

Example 1

On a cement CEM II/AV 42.5 N which contains 15% mass concentration of fly ash with a Blaine specific surface area target of 4000 $cm^2/g$, a dosage of 90 ppm of TIPA makes it possible to increase the throughput of the cement mill by 11%. On the other hand, a dosage of 120 ppm of TIPA creates harmful effects by superfluidifying the cement powder which becomes very volatile. The TIPA+HCL does not have a negative impact on the grinding of cement (no super-fluidification) and leads to improved mechanical strengths.

| Description | Dosage (ppm) | Mill throughput rate (tph) | Rc 2 d (MPa) | Rc 28 d (MPa) |
| --- | --- | --- | --- | --- |
| Reference | 0 | 70 | 24.0 | 55.2 |
| TIPA | 90 | 78 | 24.5 | 61.3 |
| TIPA | 120 ppm | NA* | — | — |
| TIPA + HCl | 143 ppm** | 76 | 25.1 | 63.1 |

*Emptying of grinding mill
**Equivalent to 120 ppm of TIPA + 23 ppm of HCl.

This example evidently demonstrates the fact that, in the grinding mill, an excessively high TIPA content impacts the grinding efficiency and leads to a drop in mechanical performance; the forming of salt of the TIPA makes it possible to overcome these drawbacks.

Example 2

Laboratory tests were carried out with a ball mill on 5 kg of clinker in the presence of various different amines. The fluidity of the powder thus obtained was analyzed by using the "rolling bottle test (RBT)", whereof the underlying principle is to measure the distance travelled by a cylindrical bottle having 9.3 cm length, diameter of 2.74. cm, empty mass with lid of 119.14 g, and containing 40 g of ground clinker which rolls over an inclined plane, like that shown in FIG. 1. The greater the distance travelled, the more the sample is conducive to a fluidity that is suitable for industrial scale.

The following table shows that the clinker ground in the presence of TIPA does not promote the fluidity of the clinker powder. This effect is explained by a distribution of the size of the particles which has a negative impact on the flow of the clinker powder contained in the bottle, which denotes an over-efficiency in respect of TIPA that is not favourable to grinding. On the other hand, when the clinker is ground with TIPA+HCL, the distance travelled by the bottle is greater, while showing that TIPA+HCL prevents the known super-fluidification effect for TIPA and brings back the clinker sample to a behaviour that is favourable to the flow of the powder on an industrial scale.

| | Control | TIPA | TIPACH |
| --- | --- | --- | --- |
| Distance travelled by the bottle of clinker (cm) | 34.0 | 28.7 | 36.7 |

Example 3

In a ball mill with single chamber (combined closed circuit between a roller press, a ball mill coupled to a $3^{rd}$ generation separator), 77 tonnes per hour of slag and 150 g/t of grinding agent (composition 1) are introduced.

The Blaine specific surface area target at the outlet of the mill is 5100 $cm^2/g$. A dosage of 150 g/t of grinding agent (composition 1) which provides 41 g/t TIPA generates adverse effects by superfluidifying the cement powder which becomes very volatile. The ball mill must be stopped because the dust filtres become saturated. This saturation is followed by measuring of the pressure at the filtre inlet—mill outlet which increases significantly with composition 1 comprising TIPA. Used at a dosage close to TIPA of 36 g/t in the grinding agent (composition 2), the TIPA+HCL has no negative impact on the grinding of the cement (no super-fluidification). The protonated amine makes it possible to maintain a discharge from the separator and a dust formation rate of the filtre equivalent to the reference. By increasing the dosage of composition 2 containing this amine salt (from 36 to 84 g/t TIPA), the Blaine surface of the slag increases thanks to the effect of the grinding agent. However, despite the reduction in the size of particles of the slag, the fine particles do not saturate the filtre, maintaining a separator discharge and a filtre dusting rate equivalent to that of the reference. Thus, the TIPA salt makes it possible to promote the grinding of the slag, while maintaining the particles in an agglomerated state and therefore without risk of dusting and super-fluidification.

| Description | TIPA Dosage (ppm) | Mill throughput rate (tph) | Discharge from separator (tph) | Pressure (mBar) at the Filtre Inlet - Mill Outlet | Dust from the Mill Filtre broyeur (g/m³) | Blaine Specific Surface Area (g/cm²) |
|---|---|---|---|---|---|---|
| Reference | 0 | 77 | 160 | 9.2 | 8 | 500 |
| Composition 1 comprising TIPA | 41 | 77 | 120 | 10.5 | 11 | 500 |
| Composition 2 comprising TIPA + HCl | 36* | 77 | 140 | 9.1 | 9 | 517 |
| Composition 2 comprising TIPA + HCl | 48** | 78 | 130 | 9.2 | 12 | 521 |
| Composition 2 comprising TIPA + HCl | 60*** | 79 | 120 | 9.4 | 17 | 524 |
| Composition 2 comprising TIPA + HCl | 84**** | 79 | 110 | 9.8 | 38 | 524 |

*Emptying of the grinding mill
**Equivalent to 36 ppm of TIPA + 7 ppm of HCl.
***Equivalent to 48 ppm of TIPA + 9 ppm of HCl
****Equivalent to 60 ppm of TIPA + 1 1 ppm of HCl
*****Equivalent to 84 ppm of TIPA + 16 ppm of HCl This example evidently demonstrates the fact that, in the grinding mill, the use of TIPA could lead to super-fluidification of the slag with a dust filtre which rapidly saturates. The forming of salt of the TIPA makes it possible to overcome these drawbacks. The inlet throughput flow rate of the grinding mill may be kept constant while also promoting the grinding of the slag and without the risk of super-fluidification.

Example 4

A cement CEM II/A LL 42.5 N containing 10% mass concentration of limestone is ground with a double-chamber ball mill (so-called open circuit configuration without coupling to a separator) to obtain a Blaine specific surface area target of 3300 cm²/g. The use of an adjuvant containing TIPA·HCl (composition 4) makes it possible to reduce even more than with an adjuvant containing TI PA (composition 3) the 45 and 25 μm discharge at the outlet of the ball mill as compared to the reference. The forming of the salt of TIPA therefore makes it possible to more effectively reduce the particle dimensions of the cement and thus to obtain a gain in compressive strengths which is higher at 2 days as compared to the control. In addition, the replacement of TIPA by a TIPA salt maintains a marked activating effect in the long term, with compressive strengths at 28 days that are clearly greater than those of the reference.

| Description | TIPA Dosage (ppm) | Discharge 45 μm (% m) | Discharge 25 μm (% m) | Rc 2 d (MPa) | Rc 28 d (MPa) |
|---|---|---|---|---|---|
| Reference | / | 20.9 | 37.0 | 27.8 | 46.6 |
| Composition 3 comprising TIPA | 163 | 16.9 | 33.2 | 26.6 | 60.1 |
| Composition 4 comprising TIPA + HCl | 163* | 15.1 | 23.6 | 29.1 | 58.2 |

*Equivalent to 163 ppm of TIPA + 31 ppm of HCl.

This example evidently demonstrates the fact that, in the grinding mill, the use of TIPA in salt form instead of TIPA makes it possible to improve the grinding efficiency resulting in a reduction in 25 and 32 μm discharges. This makes it possible to conclude that the residence time in the grinding mill of the cement CEM II/A LL 42.5 N has been extended.

Example 5

In a double-chamber ball mill combined with 2 first generation separators installed in parallel, 108 tonnes per hour of a CEM I type cement are introduced in the presence of an activator comprising TIPA (composition 5) to obtain a Blaine specific surface area of around 360 m²/kg. The CEM I 42.5 N type cement is composed of 90.5% mass concentration of clinker, 4.5% by mass of limestone and 5.0% by mass of gypsum. The use of an activator containing TIPA+HCl (composition 6) instead of TIPA (composition 5) with amine iso-dosage makes it possible to improve the grinding efficiency. For the same inlet throughput flow rate of the mill, the specific surface area of the cement is greater and the 45 μm discharge is lower in the presence of chlorinated salt of TIPA than of TIPA. Even if the inlet throughput flow rate of the mill is increased from 108 to 111 tph, the TIPA+HCL based adjuvant/admixture remains a very effective grinding agent since it maintains a high Blaine surface area. The TIPA acetate used in a grinding agent (composition 6) for its part makes it possible to obtain a specific surface area of the ground cement equivalent to that of TIPA. However, the TIPA acetate leads to a clogging of the grinder filtre which can be detected by increasing the cleaning time of the filtre and the number of purges per hour. Conversely, TIPA+HCL provides the means to form less dust during grinding and therefore to reduce the time of purging of the filtres. At 2 days, the compressive strengths are higher in the presence of TIPA+HCL because the cement is ground more finely than in the presence of TIPA or TIPA acetate. Finally, the compressive strengths at 28 days are equivalent for all the adjuvants/admixtures.

| Description | TIPA Dosage (ppm) | Mill Throughput Rate (tph) | Blaine Specific Surface Area (g/cm$^2$) | Discharge 45 μm (% m) | Cleaning Time (s/h) | Number of Purges per h | Rc 2 d (MPa) | Rc 28 d (MPa) |
|---|---|---|---|---|---|---|---|---|
| Composition 5 comprising TIPA | 74 | 108 | 362 | 9.9 | 1114 | 13 | 32.6 | 59.0 |
| Composition 6 comprising TIPA + HCl | 74* | 106 | 370 | 8.5 | 1172 | 14 | 34.3 | 58.9 |
| Composition 6 comprising TIPA + HCl | 74* | 111 | 364 | 9.8 | Not mesured | Not mesured | 31.3 | 58.9 |
| Composition 7 comprising TIPA acetate | 79** | 108 | 358 | 9.8 | 1552 | 18 | 33.3 | 60.5 |

*Equivalent to 74 ppm of TIPA + 15 ppm of HCl.
**Equivalent to 79 ppm of TIPA + 38 ppm of acetic acid.

This example evidently demonstrates the fact that, in the grinding mill, the use of TIPA+HCL makes it possible to improve the grinding efficiency of a CEM I cement as compared to TIPA and TIPA acetate, by limiting the clogging of filters and therefore the time require for cleaning the latter. The use of TIPA+HCL instead of TIPA makes it possible to obtain a slight gain in compressive strengths at 2 days and to maintain the compressive strengths at 28 days.

Example 6: Stability of Antifoam Formulation+% Air

Triisopropanolamine is known to entrain air in mortars and concrete, which can lead to a decrease in compressive strengths. Diethanolisopropanolamine (DEIPA) has a similar effect to TIPA on air entrainment. Likewise, the adjuvants/admixtures containing the protonated amines TIPA+HCL or even DEIPA+HCL promote the entrainment of air in cements. It is therefore of interest to combine TIPA+HCL and DEIPA+HCL with anti-foaming agents. Nevertheless, anti-foaming agents are by their nature chemical species that are not very soluble in water, which makes the use thereof in the formulation of grinding agents or activators complicated. They tend not to dissolve in solutions constituted primarily of water.

Formulations were produced by combining TIPA+HCL and DEIPA+HCL with an ethoxylated fatty amine type anti-foaming agent or defoamer (ADMA® 10 AMINE and ADMA® 12 AMINE from ALBEMARLE) at different dosage levels. The formulas obtained are stable, with the ethoxylated fatty amine dissolving in the protonated amine solutions according to the invention having a pH of less than 7.5.

The air entrained in a CEM I type cement with 120 ppm of protonated amine admixture was then measured for a dosage of 6 or 7 ppm of anti-foaming agent. The addition of anti-foaming agent makes it possible to reduce the entrainment of air induced by the presence of amines and to return to a value equivalent to that of the reference for a concentration of 6-7 ppm in the cement.

| Description | Amine Dosage (ppm) | Dosage of Anti-Foaming Agent (ppm) | Entrained Air (%) |
|---|---|---|---|
| Reference | 0 | 0 | 4.0 |
| TIPA | 120 | 0 | 5.1 |
| DEIPA | 120 | 0 | 5.1 |
| TIPA + HCl | 120* | 0 | 4.8 |
| TIPA + HCl with Anti-Foamer | 120* | 6 | 4.0 |
| DEIPA + HCl | 120** | 0 | 5.1 |
| DEIPA + HCl with Anti-Foamer | 120** | 7 | 3.9 |

*Equivalent to 120 ppm of TIPA + 23 ppm of HCl.
**Equivalent to 120 ppm DEIPA + 27 ppm of HCl.

It is therefore possible to formulate adjuvants/admixtures which are stable in solution based on a protonated amine and an ethoxylated fatty amine type antifoaming agent. Adding an antifoaming agent with hydrochloric salt amine provides the means to significantly reduce air entrainment in the mortar or concrete when using cement.

Example 7

In a vertical roller mill with 3 servo-controlled rollers, 200 tonnes per hour of a cement of type CEM II/BV 42.5 R containing 24% fly ash (added at the mill outlet) are introduced to obtain a cement having the targeted final fineness, with a particle size distribution defined respectively by the parameters d50 (median diameter at 50%; expressed in μm) of 12.5 and d90 (median diameter at 90%; expressed in μm) of 31.0. In the presence of an activator comprising TI PA (composition 8), the performance of the mill (production throughput rate in tonnes per hour) is established by setting the following method parameters:

Speed of the separator (in rpm/revolutions per minute) in order to control the fineness of the cement.

Differential pressure in the grinding mill (in mbar) reflecting the quantity of material present in the grinding mill and therefore the efficiency of the grinding.

Water injected into the grinding mill (in m3/h) in order to control the stability of the grinding mill and the vibrations.

The use of an adjuvant/admixture containing TIPA. HCl (composition 9) makes it possible to have a direct impact on the efficiency of the grinding by generating a cement with enhanced fineness (decrease in the parameters d50 and d90) without impact on the method parameters. The forming of the TIPA salt therefore makes it possible to reduce the particle sizes of the cement more effectively.

| Description | TIPA Dosage (ppm) | d50 (μm) | d90 (μm) | Mill Throughput Rate (tph) | Separator Speed (rpm) | Mill Differential Pressure (mbar) | Injected Water (m³/h) |
|---|---|---|---|---|---|---|---|
| Composition 8 comprising TIPA | 100 | 12.5 | 31.0 | 200 | 1450 | 17.0 | 5.8 |
| Composition 9 comprising TIPA + HCl | 100* | 11.2 | 29.5 | 200 | 1450 | 16.5 | 5.8 |
| Composition 9 comprising TIPA + HCl | 100 | 12.0 | 30.5 | 215 | 1350 | 17.2 | 4.9 |

*Equivalent to 100 ppm of TIPA + 19 ppm of HCl.

This example evidently demonstrates the fact that, in the vertical mill, the use of TIPA in the form of hydrochloric acid salt instead of TIPA makes it possible to improve the grinding efficiency resulting in a reduction in the parameters d50 and d90.

This grinding efficiency may as well translate into grinding mill productivity gains (tonnes per hour) while also adjusting the method parameters and maintaining the vertical mill in an optimised operating zone so as to ensure the targeted fineness of the cement.

The invention claimed is:

1. A method for reducing the fluidity of at least one hydraulic binder in a grinding mill, the method comprising:
   forming an inorganic acid salt of triisopropanolamine (TIPA);
   adding the inorganic acid salt of triisopropanolamine into the grinding mill,
   wherein the fluidity of the hydraulic binder is reduced.

2. The method according to claim 1, wherein the inorganic acid salt of triisopropanolamine is an acid halide salt or a salt of sulfuric acid, phosphoric acid, phosphonic acid, or hydrogen sulphate.

3. The method according to claim 1, wherein the inorganic acid salt of triisopropanolamine is an acid halide salt or a sulfuric acid salt.

4. The method according to claim 1, wherein the inorganic acid salt of triisopropanolamine is a hydrochloric acid salt.

5. The method according to claim 1, wherein the inorganic acid salt of triisopropanolamine is combined with at least one additive selected from the group consisting of alkanolamines other than inorganic acid salts of triisopropanolamine; sodium chloride, calcium chloride, sodium thiocyanate, calcium thiocyanate, sodium nitrate, calcium nitrate and mixtures thereof; glycols; glycerols; water reducing adjuvants/admixtures and high water reducing adjuvants/admixtures; sulphonated salts of melamine-formaldehyde polycondensates, commonly known as melamine-based superplasticisers; lignosulfonates; sodium gluconate and sodium glucoheptonate; polyacrylates; polyaryl ethers (PAE); polycarboxylic acids; products based on polyalkoxylated polyphosphonates; surfactants, carboxylic acids; setting retarders; and mixtures thereof.

6. The method according to claim 1, wherein one or more anti-foaming (defoamer) compounds are used in combination with the inorganic acid salt of triisopropanolamine.

* * * * *